Patented Nov. 10, 1931

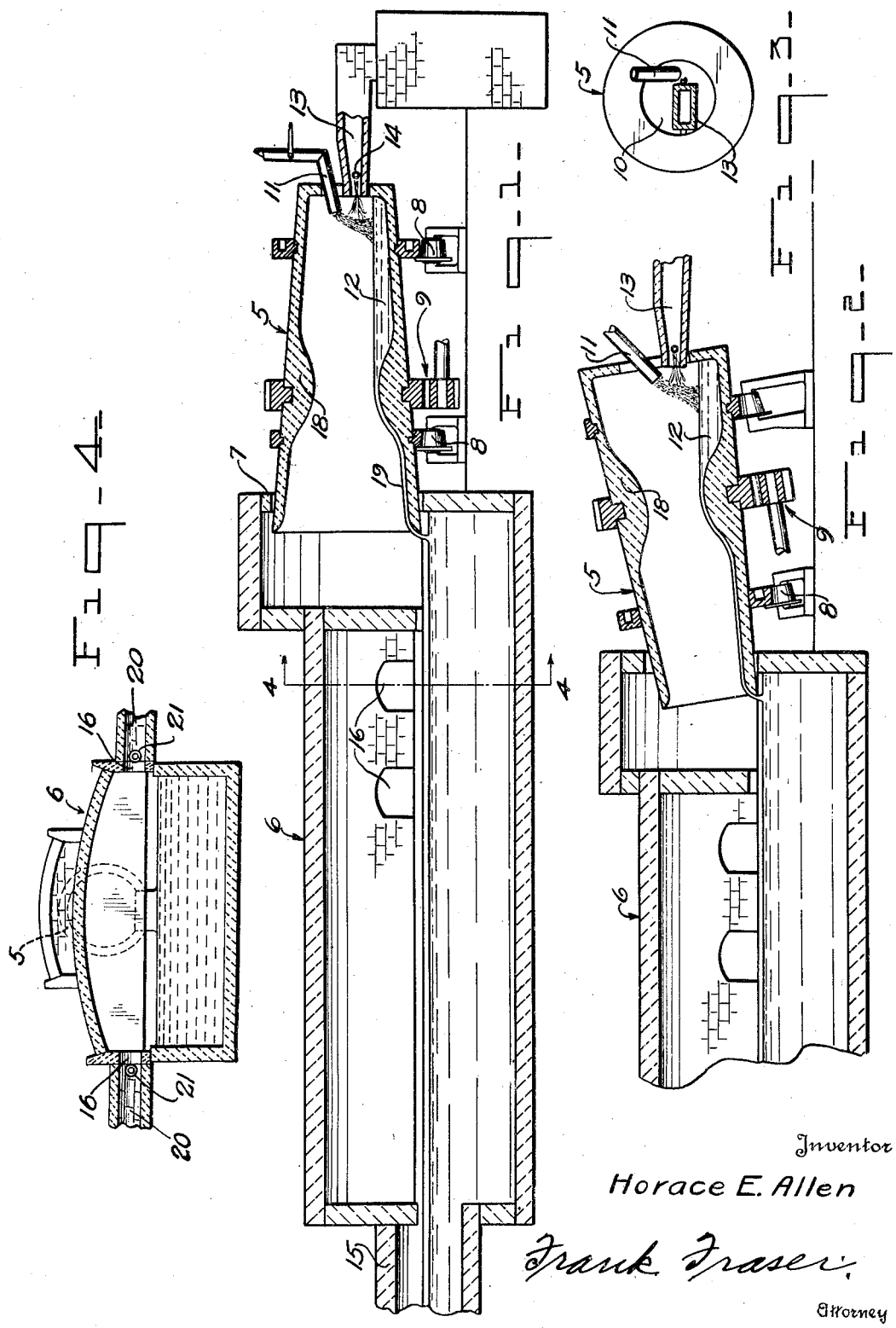

1,831,619

UNITED STATES PATENT OFFICE

HORACE E. ALLEN, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING MOLTEN GLASS

Application filed May 23, 1927. Serial No. 193,505.

The present invention relates to an improved process and apparatus for producing molten glass.

An important object of the invention is to provide such a process and apparatus for producing molten glass wherein the raw glass making materials will be thoroughly fused and amalgamated before the resultant molten glass is permitted to pass to glass article forming means.

Another object of the invention is to provide a glass melting furnace including a rotary melting tank wherein the molten glass will be thoroughly mixed, means being also provided for creating within said tank a pool of molten glass and for causing the glass to flow from the pool in a relatively thin stream.

Still another object of the invention is to provide a glass melting furnace including a refractory melting tank, and means for rotating the same in a manner that the molten glass therein will be caused to fall over and over upon itself to the end that the inside of the tank will be continually covered with a film of glass and thus protected to a large extent from the destructive action of the heating medium used for melting the glass.

Other objects and advantages of the invention will become more apparent during the course of the following description when taken in connection with the accompanying drawings.

In the drawings forming a part of this application and wherein like numerals are employed to designate like parts throughout the same, Fig. 1 is a longitudinal vertical section through improved glass melting apparatus constructed in accordance with the present invention.

Fig. 2 is a similar view showing a slightly modified type of apparatus, and

Fig. 3 is a detail end view of the melting tank.

In the drawings, the numeral 5 designates the rotary melting tank and 6 the refining tank associated therewith. As shown in Fig. 1, the melting tank 5, which is preferably constructed of refractory material and substantially conical, is horizontally arranged with its larger end projecting slightly through the adjacent end wall 7 of the refining tank 6. The melting tank 5 is preferably mounted upon rollers 8 and is adapted to be rotated by means of gears 9.

The smaller or outer end of the melting tank 5 is provided with an opening 10 and projecting into the tank through this opening is a trough or chute 11 through which the raw glass making materials are fed. These materials are then adapted to be melted within the tank 5 to form a pool of molten glass 12.

This melting of the raw materials is preferably accomplished by means of a flame entering the tank 5 through the opening 10. Air for combustion purposes is drawn in through a passage 13 from some point remote from the furnace and the gas is fed into this passage adjacent the opening 10 through a burner pipe 14. The gas fed into the passage burns with the oxygen of the air to form the fire which melts the glass producing materials. This air can be preheated, if desired, in any well known or preferred manner.

After the molten glass has been produced within the melting tank 5, it is caused to flow therefrom into the refining tank 6 and thence through a cooling chamber or the like 15 to suitable glass article forming means. The temperature within the refining tank may be suitably controlled by means of flames issuing thereinto through ports 16. One or any suitable number of these ports may be arranged at opposite sides of the refining tank 6 and air for combustion purposes is adapted to be drawn in through passages 20 while the gas may be fed into the passages adjacent the ports through suitable burners 21, these burners usually projecting slightly into the passages through the side walls thereof. The gas from the burners combining with the air entering through the passages will form flames which pass into the refining tank through the ports and by means of which the temperature of the glass therein may be controlled as desired. In the ordinary operation of this type of heating means, the flames issue into the refining tank first from the ports at one side of said tank and then from the ports at the opposite side thereof, the exhaust gases passing outwardly through the ports opposite the ports through which the flames are issuing. Of course, it is to be understood that any other desired type of heating means may be used if preferred.

In order to prevent the molten glass from flowing too rapidly from the melting tank or in other words, before it has been thoroughly fused and amalgamated, the said tank is formed with an internal annular protuberance or bulged portion 18, said protuberance acting as a dam to hold back the molten glass until it has been thoroughly mixed, the molten glass being caused to flow by gravity from the pool 12 in a relatively thin stream as at 19.

Since the melting tank 5 is being continuously rotated, it will be seen that the molten glass therein will be caused to fall over and over upon itself to the end that the resultant molten glass passing into the refining tank 6 will be thoroughly fused and mixed. In other words, the molten glass is being constantly agitated during the melting thereof and will be consequently homogeneous throughout. The annular protuberance, or bulged portion 18 retains the molten glass in the outer end of the tank where it will be subjected to the action of the heating medium and furthermore, serves to prevent the raw glass making materials from flowing into the refining tank.

Also, inasmuch as the melting tank is being constantly rotated, there will always be a thin film of molten glass covering the inside of said tank with the result that the same will be protected in a large degree from the destructive action of the heating medium or flame entering through the opening 10. The life of the tank will, as a result, be considerably increased.

The construction of the apparatus shown in Fig. 2 is substantially the same as that shown in Fig. 1, the only differences being that the melting tank is tilted somewhat and the smaller end thereof projects into the refining tank 6 instead of the larger end.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In molten glass producing apparatus of the class described, a rotary melting tank for receiving the raw glass-making materials and in which they are reduced to molten glass, and means within the rotary tank for damming the glass to create a pool, said means being so arranged that the glass flows from the pool continuously in a relatively thin stream.

2. In molten glass producing apparatus of the character described, a rotary melting tank for receiving the raw glass making materials and in which they are reduced to molten glass, a refining tank associated with said melting tank, and means within said melting tank for creating a pool of molten glass therein and for restraining the glass in a manner that it will flow by gravity from the pool into the refining tank in a relatively thin stream.

3. In molten glass producing apparatus of the character described, a rotary melting tank for receiving the raw glass making materials, a refining tank associated with one end of said melting tank, means for introducing a heating medium into the opposite end of said melting tank, and means within the melting tank for creating a pool of molten glass therein at the heating end thereof and for restraining the molten glass in a manner that it will flow by gravity from the said pool in a relatively thin stream.

4. In molten glass producing apparatus of the character described, a rotary melting tank for receiving the raw glass making materials, a refining tank associated with one end of the melting tank, means for introducing a heating medium into the opposite end thereof, the said melting tank being provided with an internal annular protuberance intermediate its ends, said protuberance creating a pool of molten glass in said tank at the heating end thereof and restraining the glass in a manner that it will flow from said pool by gravity in a relatively thin stream.

5. In molten glass producing apparatus of the character described, a rotary melting tank containing a mass of molten glass, a refining tank adjoining and in direct communication with said melting tank for receiving the molten glass therefrom, and separate means for independently controlling the temperatures of said melting and refining tanks.

6. In molten glass producing apparatus of the character described, a melting tank containing a mass of molten glass and rotatable about a substantially horizontal axis, means for introducing raw glass making materials into one end of said tank, heating means at the same end of the tank for melting the raw materials to form molten glass, and a refining tank at the opposite end of the melting tank for receiving the molten glass therefrom.

7. In molten glass producing apparatus of the character described, a melting tank containing a mass of molten glass and rotatable about a substantially horizontal axis, means for introducing raw glass making materials into one end of the tank, heating means at the same end of the tank for melting the raw materials to form molten glass, a refining tank at the opposite end of the melting tank for receiving the molten glass therefrom, and means within the melting tank for creating a pool of molten glass therein at the heating end thereof and for restraining the glass in a manner that it will flow from this pool by gravity into the refining tank in a relatively thin stream.

8. The process of producing molten glass, which consists in suitably containing the raw glass making materials, then rotating this mass in a manner to cause it to fall over and over upon itself while subjecting it to the melting action of a heating medium, and in then damming the glass in a manner to cause the resultant molten glass to flow by gravity from the upper stratums of the molten mass in a relatively thin stream.

9. In molten glass producing apparatus of the character described, a rotary melting tank containing a mass of molten glass, a refining tank adjoining and in direct communication with said melting tank for receiving the molten glass therefrom, means for controlling the temperature of the melting tank, and means for controlling the temperature of the refining tank.

10. In molten glass producing apparatus of the character described, a rotary melting tank for receiving the raw glass-making materials and in which they are reduced to molten glass, and means within the rotary tank for damming the glass to create a pool, said means being so arranged that glass flows thereover in a relatively thin stream.

Signed at Toledo, in the county of Lucas and State of Ohio, this 20th day of May, 1927.

HORACE E. ALLEN.